Patented June 9, 1942

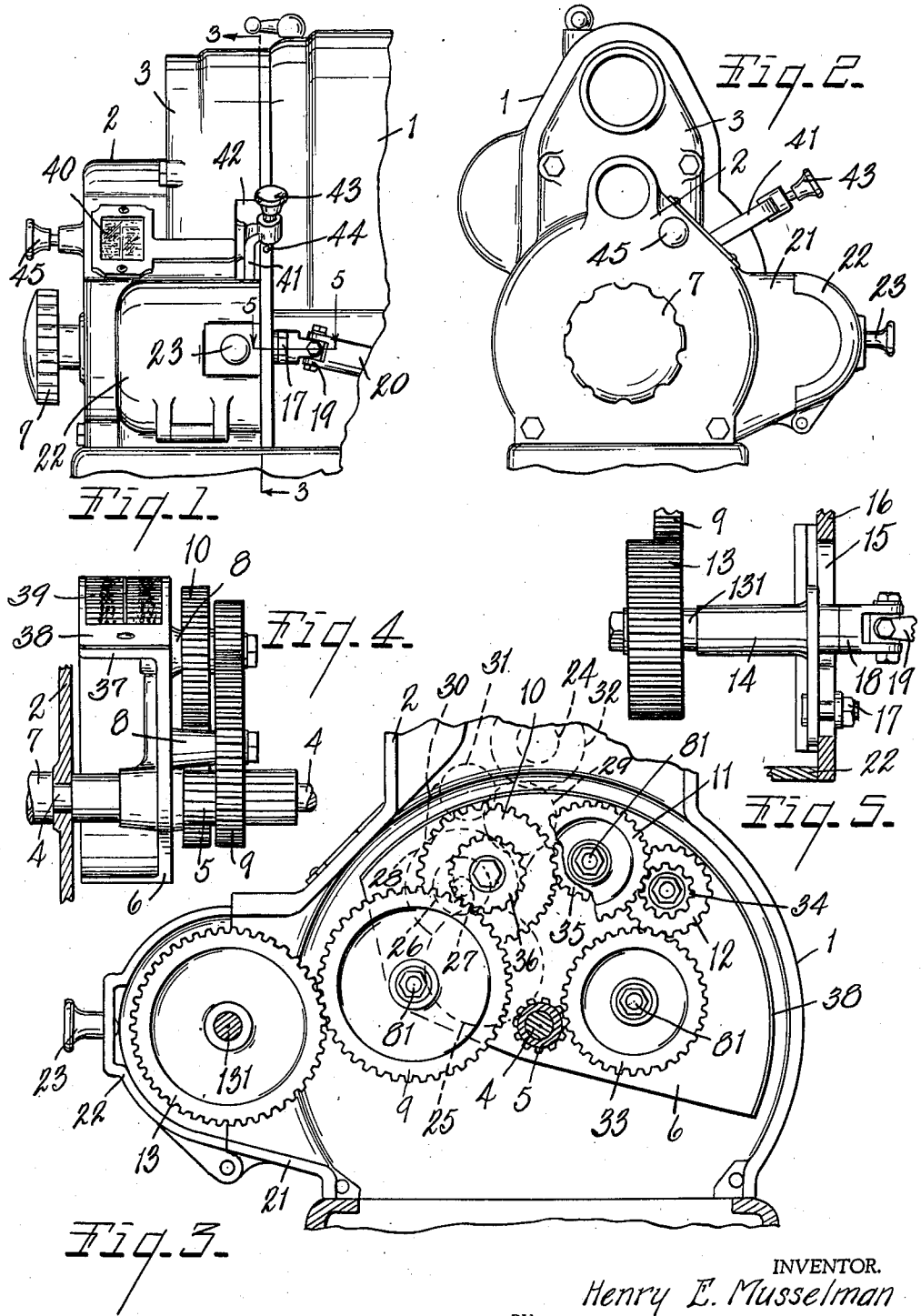

2,285,743

UNITED STATES PATENT OFFICE 2,285,743

MILLING MACHINE

Henry E. Musselman, Kalamazoo, Mich., assignor to Atlas Press Company, Kalamazoo, Mich., a corporation of Michigan Application March 26, 1941, Serial No. 385,252

1 Claim. (Cl. 74—354)

This invention relates to improvements in milling machines.

The main objects of my invention are:

First, to provide a novel and improved table drive change speed device for milling machines enabling a wide range of table speeds to be obtained.

Second, to provide a speed control device of the type described wherein manual selection to obtain desired table speed is effected quickly and easily.

Third, to provide a change speed gearing arrangement for table and like drives which is simple, compact and rugged.

Fourth, to provide a change speed gear device of the type described having associated therewith means for affording a visual indication of the setting of the gears for affording the desired gear ratio and resultant speed of operation.

Fifth, to provide a change speed device capable of adjustment to provide a relatively wide range of speeds and having further provision for multiplying this range by readily and quickly changing one of the gears of the train.

Further objects relating to details and economies of my invention will appear from the description to follow. The invention is defined in the claim.

The present invention relates to a change gear drive device for the table of a metal working machine such as a milling machine or to an equivalent drive for any similar machine. Broadly stated, the invention consists in the provisions of a gear mounting or carrier member which is readily and easily shifted to bring different gears into mesh with a driven gear and in further provisions whereby the adjusted setting of the aforesaid gear mounting member and resultant gear ratio is readily visible from the exterior of the machine, thereby enabling any desired table speed to be quickly produced with certainty and without necessitating calculation or trial and error procedure. The invention further resides in the provision of means for adjustably mounting the aforesaid driven gear so that the same may be removed and replaced by a gear of different size to still further increase the range of speeds available from the device.

A structure embodying the features of my invention is illustrated in the accompanying drawing, wherein:

Fig. 1 is a fragmentary view in side elevation illustrating a change speed device in accordance with my invention associated with a milling machine.

Fig. 2 is a fragmentary view in end elevation showing the arrangement of the parts of the device with reference to the milling machine superstructure.

Fig. 3 is a fragmentary view in section on line 3—3 of Fig. 1, illustrating structural details of the device of the invention, certain parts being shown only in dotted lines to avoid complicating the showing.

Fig. 4 is a fragmentary view in end elevation illustrating the improved gear carrier assembly which constitutes an important feature of the change speed device of my invention.

Fig. 5 is an enlarged fragmentary view in section on line 5—5 of Fig. 1, illustrating the adjustable driven gear mounting of the device.

Referring to the drawing, the reference numeral 1 indicates generally a milling or like machine, and in particular the portion of the superstructure constituting a housing for the arbor drive gears of the machine. The reference numeral 2 in general indicates the change speed or table driven control of my invention as applied to such a milling machine.

The device 2 has a housing or casing 3 preferably in the form of an extension of the milling machine housing 1, though separate and distinct therefrom, the housing 3 being adapted to receive the various gears and gear mounting means incorporated in the speed control. Referring to Fig. 3, the housing 3 has a normally fixed but manually rotatable shaft 4 arranged transversely therein. Shaft 4 has rotatably mounted thereon a pinion 5 and has secured thereto in any suitable manner the segmental cast gear supporting or carrier member 6, whereby angular or rotatable adjustment of shaft 4 effects a corresponding adjustment of member 6. As illustrated in Figs. 1 and 4, the angular position of shaft 4 and the gear carrier member 6 thereon is controllable by manipulation of the knob 7 fixed on the shaft.

Segmental gear carrier 6 is cast with a plurality of bosses 8, some long and some short, receiving stub shafts 81 upon which various change speed gears, indicated by the reference numerals 9, 10, 11, and 12, are rotatably mounted. Any suitable rotatable journalling means for these gears may be utilized. As clearly illustrated in Fig. 3, gears 9, 10, 11, 12 are of different sizes and are arranged so that the pitch line thereof at the radially outermost point from the shaft 4, is internally tangent to a theoretical circle having the said shaft at its axis. This circle is externally tangent to the pitch line of driven gear 13. This gear 13 is double width in order to engage with the gears 9, 10, 11 and 12 which are staggered. The purpose of this is to enable any one of the gears 9, 10, 11, and 12 to be placed in mesh with a driven gear 13 on a shaft 131 rotatably mounted on an adjustable bearing 14, thereby rotating the driven gear at selectively variable speeds depending on which change speed gear is in mesh therewith.

The driven gear bearing 14 is supported in an elongated laterally extending slot 15 on the end wall 16 of housing 3, being maintained in adjusted position longitudinally of the slot by means of a clamp nut 17. This enables gear 13 to be readily and quickly removed and replaced by a larger or smaller gear and meshingly engaged with whichever of the gears 9, 10, 11, and 12 is desired, to still further increase the range of speeds available. This is a feature of distinct importance in the invention; the multiplication of possible gear ratios which it makes possible will be appreciated by those skilled in the art.

Shaft 131 on which gear 13 is fixed is connected at its opposite end to member 18 of a universal coupling 19, see Figs. 1 and 5, for actuating a torque rod 20. This torque rod extends to and actuates a table drive gear (not shown) through a further universal joint or coupling (not shown) to effect the reciprocation of the milling machine table or other device which it is intended to operate, regardless of the size of the gear 13 and resultant angularity of the torque rod.

As illustrated in Fig. 3, the change speed housing 3 has an end extension 21 receiving the driven gear 13 and adjustable mounting therefor, the housing extension being covered by a closure member 22 provided with a handle 23 for opening the same when desired. Thus, convenient and quick access is had to the clamp for the driven gear bearing in the event it is desired to replace the driven gear.

The drive for the various change speed gears 9, 10, 11, and 12 derives directly from the rotatable pinion 5 on shaft 4 and from the drive shaft 24 to the milling machine by a conventional train of gearing including a reverse arrangement which train, since it is generally known in the art, I have chosen to illustrate merely in dotted lines in order to avoid complication of the drawing. Thus, pinion 5 is driven by a gear 25 meshing therewith (shown in dotted lines) and a further pinion 26 rotatable on a shaft 27 meshes with and drives gear 25. Rotating with pinion 26 on shaft 27 is a larger gear 28. Gear 28 is in continuous mesh with a gear 29 mounted on a segmental carrier 30 which is pivoted for adjustment on shaft 27. Also mounted on this carrier is the reverse idler 31, the gear 29 and idler 31 being selectively brought into meshing engagement with a drive gear 32 fixed on shaft 24 in accordance with the position of the carrier 30. Thus, as illustrated in Fig. 3, the parts are set for forward driving through the following train of gearing: drive gear 32, gear 29, gear 28, pinion 26, gear 25, and pinion 5; but when carrier 30 is shifted in clockwise direction, the drive is as follows: gear 32, idler 31, gear 29, gear 28, pinion 26, gear 25, and pinion 5. This is merely a conventional reversing arrangement and does not constitute part of my invention.

In order to drive the change speed gears 9, 10, 11, and 12 from the foregoing train of gearing I provide a large idler 33 which is rotatably mounted on a boss on support 6 and meshes directly with change speed gear 12. The latter has a smaller coaxial pinion 34 fixed thereto, which meshes with change speed gear 11. Gear 11 has a coaxial pinion 35 rotatable therewith which meshingly engages change speed gear 10, while the said change speed gear 10 has a further coaxial pinion 36 rotatable therewith which meshingly engages change speed gear 9. Accordingly, it will be appreciated that without disturbing the driving connection from the drive shaft 24, inasmuch as the large idler 33 travels orbitally around pinion 5, the support 6 may be rotatably adjusted by manipulation of knob 7 to position any one of the change speed gears 9, 10, 11 and 12 for meshing engagement with driven gear 13.

Referring to Figs. 1 and 4, it will be noted that the segmental member 6 is provided with a laterally extending arcuate or segmental flange 37 which on its periphery is provided with a strip 38 imprinted with a chart 39 containing indicia bearing information relating to the table speeds which will result from the various gear ratios effected by the aforesaid selective shifting of the gear support member 6. The indicia of chart 39 are located thereon in corresponding angular relation to the angular positioning of gears 9, 10, 11, 12 on support 6. Sufficient information is included in this chart to cover any of the ratios which will result, including those resulting from the enlargement of the range by replacement of driven gear 13. The flange 37 is positioned so that the chart 39 is visible through a glass window 40 on the housing or casing 3 so that the operator in manipulating knob 7 has before him visual and complete information as to the exact table speed which results from manipulation of the knob. The indicia visible through the window furnish all the information necessary regarding the particular gear meshing with the driven gear for any particular angular position of support 6.

The lever 41, illustrated in Figs. 1 and 2 and projecting from a slot 42 in the housing 3, is secured to the reverse gear carrier 30 and is manipulated by the operator in shifting the latter. The lever is provided with a locking pin 43 engageable in holes 44 in the casing to determine the adjusted position of the carrier. Likewise, a further retractable locking pin 45 is provided for engagement with apertures (not shown) in the segmental change speed gear supporting or carrier member 6, whereby to lock the latter in any of its adjusted speed ratio positions when the selected gear is in proper mesh with the driven gear 13. It will thus be evident that all of the manual control members are very conveniently located for manipulation by the operator in effecting the desired setting of its gearing.

It will likewise be evident that I have provided a change speed arrangement which is exceedingly simple and compact in its parts and very rugged. A large range of speeds is available by a quick manipulation of the knob 7 which range may be greatly amplified to take care of any particular job by the simple replacement of the driven gear 13. All of the information required by the operator in effecting whatever change-over is necessary is immediately at hand and no calculation, guesswork or trial and error procedure is necessary.

Though I have illustrated the structure of my improved change speed device in conjunction with a milling machine and in particular in connection with the table drive therefor, it will be apparent that it has wide adaptability to any analogous use such as in lathes for selecting spindle speed or tool feeds, in planers, shapers and the like. The advantages of increased range, simplicity, compactness, and ease and reliability of operation are present regardless of the particular adaptation to which the device is put.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

In a change-speed device of the type described, a housing, a gear carrier rotatably mounted in said housing having a plurality of double change-speed gears of different diameter thereon, the pitch line of one gear of each double gear being internally tangent to a circle concentric with the axis of said gear carrier, one gear of each double gear being in mesh with one of the gears of the next adjacent double gear whereby said gears may be rotated simultaneously, a gear rotatably mounted on an axis concentric with the axis of said carrier and having gear means connecting it in driving relationship with one gear of one of said double gears, and a gear mount having a journal thereon adapted to removably receive gears of different diameter adapted to be brought into selective mesh with one gear of each double gear by rotation of said gear carrier, the pitch line of the gear on said mount being externally tangent to said circle in the meshing relation of the gears, said mount being adjustable radially of said carrier to enable a gear thereon to be removed and replaced by a further gear of different diameter.

HENRY E. MUSSELMAN.